United States Patent [19]

Weiler

[11] 4,203,283
[45] May 20, 1980

[54] COMBUSTION CHAMBER, ESPECIALLY ANNULAR REVERSE-FLOW COMBUSTION CHAMBER FOR GAS TURBINE ENGINES

[75] Inventor: Wolfgang Weiler, Dachau, Fed. Rep. of Germany

[73] Assignee: Motoren-und Turbinen-Union Munchen GmbH, Fed. Rep. of Germany

[21] Appl. No.: 909,464

[22] Filed: May 25, 1978

[30] Foreign Application Priority Data

May 25, 1977 [DE] Fed. Rep. of Germany ....... 2723546

[51] Int. Cl.² ............................. F02C 7/00; F02C 7/12
[52] U.S. Cl. ............................... 60/39.36; 60/39.51 R; 60/736
[58] Field of Search .................. 60/39.31, 39.32, 39.36, 60/39.51 R

[56] References Cited

U.S. PATENT DOCUMENTS

| | | | |
|---|---|---|---|
| 2,638,745 | 5/1953 | Nathan | 60/39.32 |
| 2,852,914 | 9/1958 | Robin et al. | 60/39.32 |
| 3,705,492 | 12/1972 | Vickers | 60/39.51 R |
| 3,844,116 | 10/1974 | Matto | 60/39.36 |
| 3,869,864 | 3/1975 | Bunn | 60/39.36 |
| 4,050,239 | 9/1977 | Kappler et al. | 60/39.65 |

FOREIGN PATENT DOCUMENTS

| | | | |
|---|---|---|---|
| 1426325 | 1/1969 | Fed. Rep. of Germany | 60/39.32 |
| 2416909 | 10/1975 | Fed. Rep. of Germany | 60/39.51 X |

Primary Examiner—Louis J. Casaregola
Attorney, Agent, or Firm—Craig & Antonelli

[57] ABSTRACT

An annular reverse-flow combustion chamber for gas turbine engines which includes an annular chamber formed between an outer casing of the combustion chamber and a flame tube with the annular chamber being supplied with preheated air from a heat exchanger. The preheated air is directed to the flame tube for combustion, cooling or other purposes. The flame tube includes a flame tube head of a double-walled construction so as to define a further annular chamber which communicates with an air bleed line at a discharge end of a compressor so that air is taken directly from the compressor and supplied to the further annular chamber. A vaporizer pipe member is disposed at the flame tube head with at least one of the walls of the double-walled flame tube head being welded to the vaporizer pipe member.

5 Claims, 1 Drawing Figure

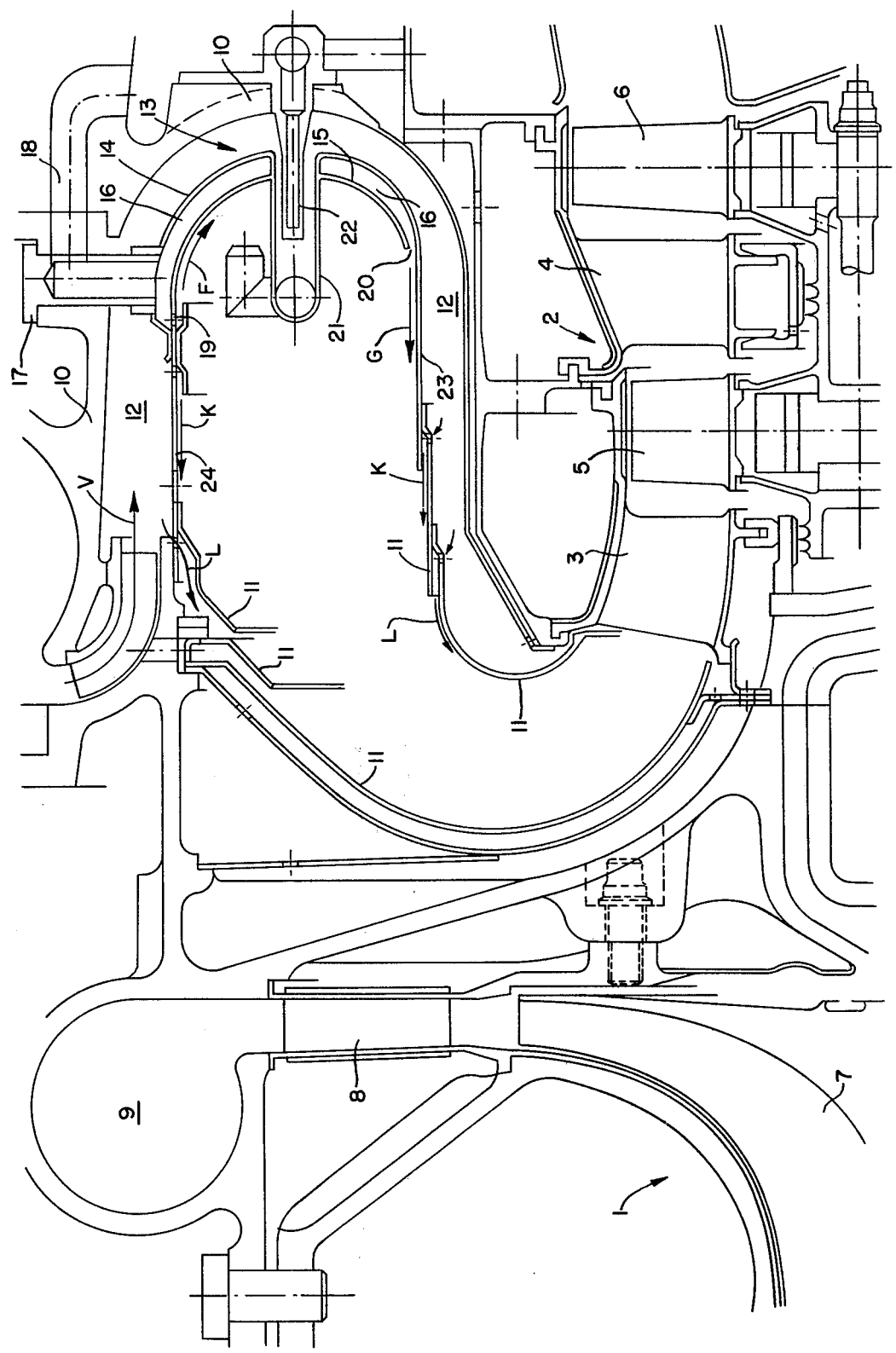

COMBUSTION CHAMBER, ESPECIALLY ANNULAR REVERSE-FLOW COMBUSTION CHAMBER FOR GAS TURBINE ENGINES

The present invention relates to a combustion chamber arrangement and, more particularly, to an annular reverse-flow combustion chamber arrangement for gas turbine engines provided with at least one heat exchanger wherein an annular chamber formed between an outer casing of the combustion chamber and a flame tube is supplied with preheated air from the heat exchanger with the preheated air being supplied to the flame tube for combustion, cooling or other purposes.

The cooling of combustion chambers of gas turbine engines provided with heat exchangers often involves considerable difficulties, and this is particularly true of engines with highly perfected working cycles, that is, engines having high specific output at low specific fuel consumption, since such engines are characterized by relatively high combustion chamber inlet temperatures and high turbine inlet temperatures.

The problem of combustion chamber cooling is further accentuated since the thermo-dynamic considerations require maximum use of heated air from the heat exchanger for cooling. However, cooling exclusively with air taken from the discharge or exit of a compressor would impair the specific fuel consumption of the engine.

A cooling arrangement for a gas turbine engine with a heat exchanger is proposed, for example, in U.S. Pat. No. 4,050,239, wherein a small proportion of the air from the compressor is branched off upstream of the combustion chamber with the branched-off air being directed into the combustion chamber and onto the flame pipe or tube so that the air flows in a cooling manner at least over and around the upstream end of the flame pipe without substantially participating in the combustion at this point. In one proposed arrangement, a guide bonnet is provided for the cooling air with the guide bonnet being spaced from an outer surface of an upstream end of the flame pipe so as to provide a flow passage for the cooling air.

The aim underlying the present invention essentially resides in providing a combustion chamber for a gas turbine engine, designed for relatively high process temperatures, which includes a heat exchanger with the combustion chamber being intensively cooled, especially in a combustion zone area in order to obtain a relatively long service life of the combustion chamber.

In accordance with the present invention, the primary zone area of the combustion chamber is cooled with air taken directly from the discharge or exit of the compressor with the remaining walls of the combustion chamber being cooled with the heated air from the heat exchanger.

According to advantageous features of the present invention, the combustion chamber is provided with double walls at least in the primary zone area thereof with air taken from the discharge of the compressor being fed into an annular chamber formed by the double walls through radially extending pipelines or the like. The air from the compressor leaves the annular chamber through a number of holes and/or louvres and results in a build-up of cooling films in the combustion chamber along the combustion chamber walls so as to achieve a wall cooling. In the double wall area of the combustion chamber zone, the double wall area of the combustion chamber zone affected by the high temperatures is additionally cooled by convection. Cooling of all other combustion chamber zones is achieved by means of heated air from the heat exchanger.

According to a further feature of the present invention, to prevent stresses induced by different thermal expansion and contraction, the two walls of the double wall are welded together only in the area of the injection nozzles and in the area of the combustion chamber outer diameter so as to permit relative sliding motion between the double walls.

In accordance with the present invention, the annular chamber defined by the two wall sections is connected to an air bleed line at the compressor discharge by means of radially extending air ducting members or lines projecting through an annular chamber formed between the combustion chamber outer casing and the flame tube.

Preferably, according to the present invention, the forward wall section of the essentially double-walled flame tube head, as viewed in the direction of the main stream in the combustion chamber, is formed so as to support a vaporizer pipe member with the forward and rear wall sections or rear wall of the flame tube being welded to the vaporizer pipe member.

Moreover, the air ducting members or lines, in accordance with the present invention, are formed as locating bolts of the combustion chamber, which bolts are arranged on the forward wall section of the flame tube head.

Accordingly, it is an object of the present invention to provide a combustion chamber arrangement for gas turbine engines which avoids by simple means drawbacks and disadvantages encountered in the prior art.

Another object of the present invention resides in providing a combustion chamber arrangement for gas turbine engines which utilizes components of a simple configuration.

A further object of the present invention resides in providing a combustion chamber arrangement for gas turbine engines which ensures a moderate cooling requirement for the hottest combustion chamber zone.

An additional object of the present invention resides in providing a combustion chamber arrangement for gas turbine engines which achieves efficient cooling regardless of the type of fuel injection.

Yet another object of the present invention resides in providing a combustion chamber arrangement for gas turbine engines wherein, if needed, hot air is available in an injection nozzle area which is advantageous with, for example, a vaporizer and air spray system where an air spray system would be constructed as, for example, an air-operated fuel atomizer nozzle.

A still further object of the present invention resides in providing a combustion chamber arrangement for gas turbine engines wherein the thermal energy recovered by the heat exchanger process is exploited almost completely for the combustion process while simultaneously cooling intensively and specifically the combustion chamber portions pertaining to the combustion zone by means of relatively cold air tapped at the compressor exit or discharge.

Yet a further object of the present invention resides in providing an arrangement for gas turbine engines which is applicable to all types of combustion chambers and, also, applicable to, for example, straight can-type combustion chambers or combined can-annular combustion chambers.

These and other objects, features and advantages of the present invention will become more apparent from the following description when taken in connection with the accompanying drawing which shows, for the purpose of illustration only, one embodiment in accordance with the present invention, and wherein:

The single FIGURE is an axial, partially schematic, cross-sectional view of an annular reverse-flow combustion chamber of a gas turbine engine in accordance with the present invention.

Referring now to the drawing, a gas turbine engine is provided which includes a centrifugal compressor generally designated by the reference numeral 1 driven by an axial-flow turbine generally designated by the reference numeral 2 which includes nozzle vanes 3, 4 and rotor blades 5, 6.

A centrifugal impeller 7 is provided with a radial-flow diffuser 8 being arranged immediately downstream of the impeller 7. Compressor air from the radial-flow diffuser 8 enters an air duct 9, formed in the casing or housing of the engine. The air duct 9 communicates with a heat exchanger (not shown) which preheats the compressor air prior to the air entering the combustion chamber.

The preheating of the compressor air to be supplied to the combustion chamber can be achieved by utilizing a portion of the heat contained in the turbine exhaust gas by allowing the exhaust gas to flow through the heat exchanger prior to escaping to the atmosphere through an exhaust line. The heat exchanger may, for example, be constructed as a rotatably arranged regenerative heat exchanger having an exchanging matrix which is alternately subjected to hot exhaust gases and compressor air.

An annular chamber 12 is formed between an outer casing 10 of the combustion chamber and the flame tube. The outer casing 10 is partially formed by components of the engine casing or housing. In operation, the annular chamber 12 is supplied with preheated air from the heat exchanger in the direction of the arrow V. The preheated compressor air is directed from the annular chamber 12 in a manner more fully described hereinbelow to the interior of the flame tube as combustion, mixing and cooling air.

With an arrangement such as described hereinabove, it is essential that the combustion chamber is cooled in the primary zone area with air taken directly from the discharge or exit of the compressor. For this purpose, a flame tube head generally designated by the reference numeral 13 is provided which is of a double-wall construction so as to define an annular chamber 16 between two wall sections 14, 15 of the flame tube head 13. The annular chamber 16 communicates, by means of air ducting members or lines 17 extending through the annular chamber 12, with a bleed air supply through one or more pipelines 18. The annular chamber 16 communicates, by way of holes 19 or annular slots or louvres 20 at an upstream end, with the interior of the flame tube for the purposes of forming cooling films designated by the arrows F, G along the inner wall of the flame tube. The cooling film designated by the arrow F can simultaneously be used to reduce carbon deposits by blowing away any fuel residues which may have settled on the rear wall of the flame tube.

The forward wall section of the flame tube head 13 alternatively terminates in a vaporizer tube member 21. The wall section 15 of the flame tube head 13, which may alternatively consist of an upper and lower annular shell half, or the rear wall of the flame tube, is alternatively welded to the vaporizer tube member 21. Several fuel injection nozzles may project into the vaporizer tube member 21 with one such fuel injection nozzle being designated by the reference numeral 22. The air ducting members 17 extending through the annular chamber 12 are provided in or formed as combustion chamber locating bolts which are arranged on the outer casing 10 and on the front wall section 14 of the flame tube head 13.

As apparent from the single FIGURE of the drawing, the forward wall section 14 of the flame tube head 13 is extended in the shape of an inner flame tube wall member 23 projecting in the axial direction of the combustion chamber with the rear wall section 15 being extended in the shape of an outer flame tube wall member 24 projecting in an axial direction of the combustion chamber.

To compensate for thermally-induced material expansions or contractions, it is advantageous to weld the front wall section 14 or inner flame tube wall member 23, rear wall section 15 or outer flame tube wall member 24, and vaporizer tube member 21 together only in an area of the injection nozzles while providing for their relative sliding movement axially in the area of the maximum diameter.

The remaining portion of the preheated compressor air contained in the annular chamber 12 of the combustion chamber can be used to cool sufficiently and intensively the outer flame tube wall member 24 and inner members 11, respectively, of the flame tube which are not subjected directly to the high thermal loads caused by the combustion process. The cooling is achieved by film or wall cooling indicated by the arrows K, L.

The radially outer downstream end of the forward wall section 14 of the flame head 13 is preferably arranged for sliding movement in the axial direction of the combustion chamber along the cylindrical portion of the outer flame tube wall member 24.

While I have shown and described only one embodiment in accordance with the present invention, it is understood that the same is not limited thereto, but is susceptible of numerous changes and modifications as known to those having ordinary skill in the art, and I therefor do not wish to be restricted to the details shown and described hereinabove, but intend to cover all such changes and modifications as are encompassed by the scope of the appended claims.

I claim:

1. An annular reverse-flow combustion chamber for gas turbine engines provided with at least one heat exchanger and a compressor, an annular chamber formed between an outer casing of the combustion chamber and a flame tube, the annular chamber is supplied with preheated air from the heat exchanger with the preheated air being directed to the flame tube for combustion, cooling or other purposes, characterized in that the flame tube includes a flame tube head arranged in a primary combustion zone area of the combustion chamber, the flame tube head includes, as viewed in a direction of flow of the preheated air, a forward wall section and a rearward wall section spaced from each other so as to define therebetween a further annular chamber, means are provided for communicating said further annular chamber to an air bleed line at a discharge end of the compressor such that air is taken directly from the compressor and supplied to the further annular chamber including radially extending air ducting members projecting through said first-mentioned annular chamber, at least one vaporizer pipe member is disposed at the flame tube head, at least one of the forward wall section or the rearward wall section is welded to the vaporizer pipe member, means are provided at said flame tube for forming a cooling film along at least portions of an inner wall of the flame tube including at least one means for communicating a downstream end of said further annular chamber with the interior of the flame tube, said air ducting members are formed in locating bolts for locating the combustion chamber relative to a casing of the engine, and the locating bolts are arranged on the forward wall section of the flame tube head.

2. A combustion chamber according to claim 1, characterized in that a radially outer downstream end of the forward wall section of the flame tube head is mounted on an outer cylindrical surface of the flame tube so as to be slidable in an axial direction of the combustion chamber.

3. An annular reverse-flow combustion chamber for gas turbine engines provided with at least one heat exchanger and a compressor, an annular chamber formed between an outer casing of the combustion chamber and a flame tube, the annular chamber is supplied with preheated air from the heat exchanger with the preheated air being directed to the flame tube for combustion, cooling, or other purposes, characterized in that the flame tube includes a flame tube head arranged in a primary combustion zone area of the combustion chamber, the flame tube head includes, as viewed in a direction of flow of the preheated air, a forward wall section and a rearward wall section spaced from each other so as to define therebetween a further annular chamber, means are provided for communicating said further annular chamber to an air bleed line at a discharge end of the compressor such that air is taken directly from the compressor and supplied to said further annular chamber, at least one vaporizer pipe member is disposed at the flame tube head, at least one of the forward wall section or the rearward wall section is welded to the vaporizer pipe member, air ducting members are formed in locating bolts for locating the combustion chamber relative to a casing of the engine, and the locating bolts are arranged on the forward wall section of the flame tube head.

4. A combustion chamber according to claim 3, characterized in that a radially outer downstream end of the forward wall section of the flame tube head is mounted on an outer cylindrical surface of the flame tube so as to be slidable in an axial direction of the combustion chamber.

5. A combustion chamber according to claim 3, characterized in that means are provided at said flame tube for forming a cooling film along at least portions of an inner wall of the flame tube.

* * * * *